United States Patent [19]

Sakamoto et al.

[11] Patent Number: 4,840,830
[45] Date of Patent: Jun. 20, 1989

[54] POLYESTER FILM FOR MAGNETIC RECORDING TAPE

[75] Inventors: Seiji Sakamoto, Machida; Kiyoshi Yasumura, Yokohama, both of Japan

[73] Assignee: Diafoil Company, Limited, Tokyo, Japan

[21] Appl. No.: 105,977

[22] Filed: Oct. 6, 1987

Related U.S. Application Data

[63] Continuation of Ser. No. 931,871, Nov. 17, 1986, abandoned, which is a continuation of Ser. No. 821,881, Jan. 27, 1986, abandoned, which is a continuation of Ser. No. 599,332, Apr. 12, 1984, abandoned.

[30] Foreign Application Priority Data

May 2, 1983 [JP] Japan ................................. 58-77927

[51] Int. Cl.$^4$ ............................................. B32B 27/36
[52] U.S. Cl. ..................................... 428/141; 428/409; 428/480; 523/181; 528/398
[58] Field of Search ......................................... 428/141

[56] References Cited

U.S. PATENT DOCUMENTS

| | | | |
|---|---|---|---|
| 4,067,855 | 1/1978 | Miwa et al. | 528/286 |
| 4,096,109 | 6/1978 | Watanabe et al. | 523/181 |
| 4,138,386 | 2/1979 | Motegi et al. | 524/135 |
| 4,304,807 | 12/1981 | Kawakami et al. | 428/409 |
| 4,338,367 | 7/1982 | Kawakami et al. | 428/409 |
| 4,348,446 | 9/1982 | Mitsuishi et al. | 428/148 |
| 4,439,479 | 3/1984 | Kanai et al. | 428/148 |

FOREIGN PATENT DOCUMENTS

| | | |
|---|---|---|
| 158619 | 12/1980 | Japan . |
| 3430 | 1/1981 | Japan . |
| 2037184 | 7/1980 | United Kingdom . |
| 2087302 | 5/1982 | United Kingdom . |

*Primary Examiner*—Paul J. Thibodeau
*Attorney, Agent, or Firm*—Oblon, Spivak, McClelland, Maier & Neustadt

[57] ABSTRACT

A polyester film suitable for use as the magnetic tape base for video recording, capable of high density recording and having stable slidability or running characteristics. The polyester film is made of a polyester which contains 0.05-1 wt % particles containing calcium and phosphorus and of which the number n of the second interference fringes (number/mm$^2$) and the average centerline roughness ($\mu$m) satisfy the following relationships:

$$n < 30 \qquad (1)$$

$$0.005 \leq R_a \leq 0.025 \qquad (2)$$

5 Claims, No Drawings

POLYESTER FILM FOR MAGNETIC RECORDING TAPE

This is a continuation of Ser. No. 931,871 filed on Nov. 17, 1986, now abandoned which is in turn a continuation of Ser. No. 821,881 filed Jan. 27, 1986, now abandoned, which in turn is a continuation of Ser. No. 599,332, filed Apr. 12, 1984 now abandoned.

TECHNICAL FIELD OF THE INVENTION

This invention relates to a polyester film for magnetic recording tapes. More particularly, this invention relates to a biaxially stretched polyester film excellent in windability during manufacturing, slidability in use as a magnetic recording tape and electromagnetic characteristics.

BACKGROUND OF THE INVENTION

Today polyester films are widely used as the base material for magnetic recording tapes because of their excellent mechanical and thermal properties as well as their dimensional stability.

In the field of magnetic recording tape, there is a demand of video recording tapes is rapidly increasing. Although the characteristics required of the video recording tape vary greatly, high density recording performance is strongly desired for prolonged time recording in tapes used with home video sets.

In order to carry out high density recording, employment of shorter recording wavelength and a narrower track is required, which inevitably tends to reduce playback output and increase noise to signal ratio.

In this case, it is required to make close the contact between the video head and the tape in order to decrease the so-called spacing loss. In this connection, a base film as smooth as possible is required in order to make the magnetic surface as smooth as possible.

However, as the film surface is made smoother, slidability which is another important property required of the base film, tends to be impaired. Especially in the case of prolonged time recording, where the running speed of the tape is made very slow, the tape must run at a stable speed. Moreover, stability in the running speed when a tape is repeatedly used, is required.

Polyester films are usually manufactured by melt-extruding a polyester material in a sheet and biaxially stretching the sheet longitudinally and transversely, and finally winding it into a roll. In this case, however, troubles often occur in winding-up the film if the film surface is smooth. For instance, end edges of a roll become irregular, or creases, wrinkles or flaws occur in the wound-in part of the sheet or the wound-up surface.

Under such circumstances, we searched for a process for manufacturing a polyester film, which would be excellent in windability (wound-up characteristics) during film making, and would provide the magnetic tape produced therefrom with satisfactory electromagnetic properties, and that would have excellent slidability in repeated use. As a result, we have found that a polyester film satisfying the above property requirement to a high degree can be obtained by incorporating a specific kind of particles in a film and furnishing the film with a surface roughness which satisfies specific conditions. This invention was accomplished on the basis of this discovery.

DISCLOSURE OF THE INVENTION

This invention resides in a polyester film which contains 0.05–1 wt % of particles containing calcium and phosphorus and whereof the number $H_2$ (number/mm$^2$) of the secondary interference fringes as measured by the multiple interference method and the average centerline roughness $R_a$ (μm) satisfy the following relations (1) and (2).

$$H_2 < 30 \tag{1}$$

$$0.005 \leq R_a \leq 0.025 \tag{2}$$

The invention will now be described in detail.

Polyester film referred to herein is a film made by melt extrusion and stretching of a polymer mainly comprising poly(ethylene terephthalate), such as poly(ethylene terephthalate) homopolymer, a copolymer or block copolymer containing at least 80 mole % ethylene terephthalate. However, one of the characteristics of this invention is that the film has fine particles of inert substances incorporated therein.

It is well known to incorporate in a polyester film fine particles which are inert relative to said polyester in order to improve the slidability or the running characteristics of the film. We have learned that particles which retain the smoothness of the film surface as much as possible and that are especially effective for improving slidability or running characteristics of the film are particles which contain specific elements and are deposited by reaction of some calcium-containing compounds and specific phosphorus-containing compounds during manufacturing of the polyester.

Such particles can be formed by the following method.

Prior to the ester interchange reaction, a calcium compound which is soluble in the reaction system is added to the system, and further the calcium compound is added after the ester interchange reaction has been finished if necessary; and prior to the start of the condensation polymerization reaction, a plurality of phosphorus compounds comprising a trivalent phosphorus compound and a pentavalent compound.

Most suitable conditions should be selected in polymerization, since the form of the particles deposited differs in accordance with the species of the phosphorus compound, the molar ratio of the trivalent phosphorus compound and the pentavalent phosphorus compound, the molar ratio of the phosphorus compounds to the calcium compound, the time when the phosphorus compounds are added, polymerization conditions such as rate of temperature increase, evacuation, etc.

The polyester film of this invention which is prepared of the polyester containing such specific particles is characterized by a specific uniform minute surface structure. An example of an especially suitable process for preparing such a polyester is specifically explained below.

A calcium compound is used as an ester interchange catalyst, and further the calcium compound is added to the system after the completion of ester interchange reaction so that the total amount of the calcium compound is 0.3–1 mole %, preferably 0.35–0.6 mole % with respect to the total amount of the acid components in the polyester producing materials. Any calcium compound can be used insofar as it is soluble in the reaction system. Examples of such compounds are calcium salts of aliphatic carboxylic acids, calcium salts of aromatic carboxylic acids, calcium alkolate, etc. Calcium acetate is preferred.

When the total amount of the added calcium compound is less than 0.3 mole %, the number of deposited particles is too small to realized the effect envisioned by this invention, and when the amount is in excess of 1 mole %, often many undesirable coarse particles are formed.

A plurality of phosphorus compounds comprising a trivalent phosphorus compound and a pentavalent phosphorus compound are used. Phosphoric acid, phosphorus acid, and trialkyl esters and partial alkyl esters of these acids can be used. According to our finding, particle size of the deposited particles, which is an important factor in the invention, is largely influenced by acidity of the pentavalent phosphorus compound.

Usually, when phosphoric acid or a partial alkyl ester thereof is used, the size of the formed particles is smaller than desired, and when a trialkylester of phosphoric acid is used, the size of the formed particles is larger than desired. Therefore it is necessary to obtain particles of desired size by employing a proper mixture of these phosphorus compounds, for instance. It is desirable to use a mixture wherein the molar ratio of the pentavalent phosphorus compound to the trivalent phosphorus compound is 1–20, preferably 2–10.

It is preferred that the total amount of the used phosphorus compounds be 0.7–3 times the molar amount of the calcium compounds, since most or all of the deposited particles are calcium salts of phosphoric acid or phosphorus acid derivatives, which contribute to improvement of the slidability of the polyester film. When the molar ratio is less than 0.7, particles of calcium salts of polyester oligomer are predominantly formed, which have poor effect toward improvement of the slidability. On the other hand, when the molar ratio is in excess of 3, the polymerization rate in preparation of the polyester becomes low.

After addition of the phosphorus compounds, polyester is prepared by the conventional condensation polymerization, wherein any known condensation polymerization catalyst, such as antimony compounds, germanium compound, etc. can be used.

The particles required for the polyester film of this invention can be formed by the procedure as described above, whereby the deposited particles must be contained in an amount of 0.05–1% by weight. If the amount of the deposited particles is less than 0.05 by weight, the windability (wound-up characteristics) and slidability are not sufficiently improved, and if the amount is in excess of 1% by weight, coarse particles are formed in a larger proportion, which impairs the electromagnetic characteristics of the magnetic tape.

It is necessary tat the deposited particles contain calcium and phosphorus each in an amount of 1–15 wt %, preferably 5–12 wt %. The amount of the metallic elements other than calcium should be less than 0.2 times the molar amount of calcium, preferably less than 0.1 times.

The polyester film of this invention is obtained by biaxially stretching the thus obtained polyester containing the specific particles by the ordinary process, but the film must have a surface structure which satisfies the specific conditions.

That is to say, the number $H_2$ of the secondary interference fringes as determined by the multiple interference method must be less than 30 (number/mm$^2$), and the average centerline roughness $R_a$ must be 0.005–0.025 ($\mu$m).

When $H_2$ is 30 or more, coarse protrusions tend to appear in a larger number in the film surface, which impairs the electromagnetic characteristics of the magnetic tape, and thus such a film is not suitable as a base film for a magnetic tape. This value must be less than 30, preferably less than 25. The same tendency is observed when the $R_a$ value exceeds 0.025 ($\mu$m). Thus $R_a$ must be not more than 0.025 ($\mu$m), preferably not more than 0.02 ($\mu$m). On the other hand, if $R_a$ is less than 0.005 ($\mu$m), the edge faces of wound up rolls of the tape become irregular when a film is wound, or other troubles occur. Also, when the finished magnetic tape is used, especially when it is repeatedly used, the slidability or running characteristic becomes unstable, and the tape may unexpectedly stop or may be irregularly wound, or deformed. The $R_a$ value should preferably be not less than 0.008 ($\mu$m), more preferably not less than 0.01 ($\mu$m).

Should the n value be kept constant, it is desirable that the $R_a$ value be as large as possible within a permitted range. In the polyester film of this invention, the following relationship should preferably be satisfied:

$$R_a > 2 \times 10^{-4} H_2 + 0.01$$

As has been explained, the required conditions in the polyester film of this invention are that the number n of the secondary interference fringes measured by the multiple interference method and the average centerline roughness $R_a$ be respectively within specified ranges, and these requirements are met by using a particular polyester material.

That is to say, the requirements are met by making a film using a polyester material prepared by the method of preparing the polyester containing particles which contain calcium and phosphorus, said method being characterized in that a larger amount of a calcium compound, that is, not less than 0.3 mole % thereof is used, and that said calcium compound is reacted with a trivalent phosphorus compound and a pentavalent compound a part of which exhibits acidity as explained above in detail.

Of course, even if the above-mentioned particular polyester is employed, the surface structure of obtained films may vary depending upon the conditions of film making. In this invention, therefore, film making conditions under which the above-described surface structure is resulted must suitably selected from among the known conditions. For instance, suitable conditions can be selected from the disclosure of Japanese Patent Publication No. 5639/55.

As has been described above in detail, this invention relates to a polyester film for magnetic tapes, which is made of a specific polyester containing particles which contain specific elements and are deposited during preparation of said polyester, and has a surface structure satisfying particular conditions. The characteristics of the surface structure are that the surface has a large number of extremely uniform minute protrusions.

Therefore, the film of this invention has remarkably few coarse protrusions and is excellent in electromagnetic characteristics when made into a magnetic tape. The tape is excellent in slidability, especially running characteristics when repeatedly used, in spite of the fact that average surface roughness is small. Moreover, the film of this invention is free from troubles when it is wound in the course of film making. Troubles in winding frequently occur with films having low surface roughness. Therefore, the film of this invention has marked industrial advantages.

DESCRIPTION OF THE EMBODIMENTS OF THE INVENTION

Now the invention will be explained in further detail by way of working examples and comparative examples. However, the invention is not limited by these working examples. In the following description, "part" means "part by weight". The methods used for various measurements and preparation of magnetic tapes are as follows:

(1) Determination of the amount of deposited particles

To 100 g of polyester, 1.0 l of o-chlorophenol was added, and the mixture was maintained at 120° C. for 3 hours. Thereafter, the mixture was centrifuged with a centrifuge ("55P-72" made by Hitachi Koki K.K.) at 30,000 r.p.m for 40 minutes. The particles were separated and vacuum-dried. The particles were tested by a scanning differential calorimeter. When a peak of melting corresponding to the polymer appeared, the particles were again treated with o-chlorophenol, heated and separated by centrifugalization until no melting peak appeared. Melting peak usually disappeared after two runs. The thus separated particles were weighed.

(2) Determination of number of secondary interference fringes by the multiple interference method A film specimen coated with evaporated aluminum was observed under a surface finish microscope made by Nippon Kogaku K.K., and the number of secondary interference fringes was counted and converted into a number per mm$^2$. The reflection ratio of the mirror used was 65%, and the magnification of the microscope was 200. The wavelength employed was 0.54μ. The larger the number of secondary interference fringes, the larger is the size of the coarse protrusions are.

(3) Determination of average centerline roughness

Average centerline roughness was determined in accordance with the method of JIS (Japanese Industrial Standards) B0601-1976. A three-dimensional roughness tester with analyzer ("AY 22" made by Kosaka Kenkyusho). The cut-off value was 0.08 mm. Measurement was carried out for a length of 25 mm.

(4) Evaluation of windability

Five thousand (5,000) meters of a film being manufactured at a line speed of about 150 m/min was wound around a paper tube 15 cm in diameter, and the end faces were observed and classified into the following three ranks.

A: Completely smooth
B: Partly irregular
C: Almost totally irregular over entire area Also occurrence of creases, wrinkles or flaws in the wound film was observed by rewinding the film. A film in which no creases, wrinkles or flaws were observed over the whole length of 5000 meters was ranked A. One in which 10 or more creases, wrinkles or flaws were observed was ranked C. And those falling in between were ranked B.

(5) Preparation of magnetic tape

The following composition was mixed and kneaded in a ball mill for 24 hours.

| Ingredients | Parts |
| --- | --- |
| Ferromagnetic material mainly comprising γ-Fe$_2$O$_3$ | 250 |
| Polyurethane | 40 |
| Nitrocellulose | 15 |
| Poly(vinyl chloride-vinyl acetate) | 25 |
| Lecithin | 10 |
| Methylethylketone | 250 |
| Butyl acetate | 250 |

To the resulting mixture, 15 parts of a polyisocyate was added and the dispersion operation was further continued for one hour to give a magnetic coating material. This material was applied on a film so as to form a layer 6 μm thick in the dry state, and the film was subjected to magnetic orientation treatment before the coated layer dried. The coated film was passed through an oven, thus was dried and cured. The cured film was super-calendered and slit into tapes ½ inch in width.

(6) Slidability or running characteristics

As an index of slidability or running stability, the static friction coefficient of the surface of the diamagnetic layer was measured by the method of ASTM D1894-63. An ordinary deck was used. The friction coefficient after the first test run of 100 m was designated $\mu_1$ and that after 100 runs was designated $\mu_{100}$. The lower these value, the better is the slidability.

(7) Electromagnetic characteristics

VTR head output was determined by a synchroscope. The measurement was carried out at 4 megahertz, and the head output (in db unit) was measured with 1 mV as the standard. The higher the value, the better the characteristics.

EXAMPLE 1

(Preparation of polyester)

One hundred (100) parts dimethyl terephthalate 70 parts ethyleneglycol and 0.09 part calcium acetate monohydrate (0.1 mole % to 1 mole of dimethyl terephthalate) were placed in an ester interchange reactor. The reaction was allowed to continue for 4 hours, at the end of which the temperature reached 223° C. and the ester interchange was substantially completed.

Then, to the reaction mixture, 0.27 part (0.3 mole calcium acetate monohydrate was added, and further 0.07 part triethyl phosphite, 0.30 part triethyl phosphate, 0.006 part ethyl acid phosphate were added (the pentavalent phosphorus compound to the trivalent phosphorus compound was 4, and the total amount of the calcium compound was equimolar with the total amount of the phosphorus compounds). Polymerization was effected with 0.05 part antimony trioxide added by the conventional process. After 4 hours, the reaction was terminated and a polyester having intrinsic viscosity of 0.64 was obtained.

The amount of the deposited particles was measured, and found to be 0.6% by weight on the basis of the weight of the polyester. Calcium accounted for 8.8 wt %, and phosphorus for 8.2 wt % of the deposited particles.

(Preparation of polyester film)

The thus obtained polyester was extruded by an extruder at 290° C. to form an amorphous sheet. The sheet was stretched longitudinally at 95° C. by a factor of 3.4, transversely at 105° C. by a factor of 3.6 and was finally heat-treated at 200° C. for 3 seconds, whereby a biaxially stretched polyester film was obtained.

The number of the secondary interference fringes of the film measured by the multiple interference method and the test results of the average centerline roughness are indicated in Table 1.

Evaluation of the appearance of wound-up tapes is also indicated in Table 1.

(Evaluation as magnetic tape)

To the film obtained as described above, a magnetic layer was applied, dried and the film was slit into tapes as described under (5) above. The slidability and electromagnetic characteristics of the tapes are indicated in Table 1.

EXAMPLE 2 AND COMPARATIVE EXAMPLES 1–3

In accordance with the same procedure as in Example 1 except that the conditions indicated in Table 1 were employed, polyesters were prepared and biaxially stretched films were made and prepared into magnetic tapes. The characteristics of these films and magnetic tapes are also shown in Table 1.

$$H_2 < 25 \quad (1)$$

$$0.001 \leq R_a \leq 0.025 \quad (2)$$

$$R_a > 2 \times 10^{-4} H_2 + 0.01 \quad (3)$$

and wherein the total amount of the calcium compound is 0.3–1 mol % based on the total amount of the acid components in the polyester film, the molar ration of the phosphorus compound to the calcium compound of 0.7–3, the amount of calcium and phosphorus per particle is about 1–15% by weight, and the molar ratio of the pentavalent to the trivalent phosphorus compound is 1–20, and wherein the trivalent phosphorus compound is selected from the group consisting of phosphorus acid, trialkylesters of phosphorus acid, and partial alkylester of phosphorus acid, and the pentavalent phosphorus compound consists of a mixture of phosphoric acid and a trialkylester of phosphoric acid and a partial alkylester of phosphoric acid.

2. The polyester film according to claim 1, wherein said particles contain calcium and phosphorus each in an amount of about 5 to 12% by weight.

3. The polyester film according to claim 1, wherein

TABLE 1

|  | | Compounds added after ester interchange | | | Biaxially stretched film | | Windability of film | | Characteristics of magnetic tape | | |
|---|---|---|---|---|---|---|---|---|---|---|---|
|  | Ester interchange catalyst | Calcium compound* | Trivalent phosphorus compound* | Pentavalent phosphorus compound | | $H_2$ (number/ mm²) | $R_a$ (μm) | Edge face | Wrinkles, flaws, etc. | Slidability | | VTR head output (db) |
|  |  |  |  | Triethyl phosphate* | Ethyl acid phosphate* |  |  |  |  | $\mu_1$ | $\mu_{100}$ |  |
| Example 1 | Ca acetate 0.1 mole % | Ca acetate 0.3 mole % | Triethyl phosphite 0.08 mole % | 0.32 mole % | 0.008 mole % | 22 | 0.017 | A | A | 0.30 | 0.34 | −2.5 |
| Example 2 | Ca acetate 0.1 mole % | Ca acetate 0.3 mole % | Trimethyl phosphite 0.10 mole % | 0.32 mole % | 0.02 mole % | 14 | 0.014 | A | A | 0.32 | 0.37 | −2.3 |
| Comparative Example 1 | Ca acetate 0.1 mole % | Ca acetate 0.3 mole % | Trimethyl phosphite 0.10 mole % | 0.32 mole % | — | 96 | 0.028 | A | A | 0.28 | 0.34 | −4.0 |
| Comparative Example 2 | Ca acetate 0.1 mole % | — | Triethyl phosphite 0.02 mole % | 0.06 mole % | 0.06 mole % | 2 | 0.004 | C | C | 0.85 | 1.1 | −1.0 |
| Comparative Example 3 | Li acetate 0.3 mole % | Ca acetate 0.1 mole % | — | 0.20 mole % | 0.02 mole % | 46 | 0.011 | A | B | 0.39 | 0.45 | −3.8 |

*Mole % with respect to dimethyl terephthalate

We claim:

1. A polyester film, comprising 0.05–1% by weight of particles consisting essentially of calcium and phosphorus, formed by the reaction of a calcium compound, a trivalent phosphorus compound and a pentavalent phosphorus compound during polymerization, and in which the number, $H_2$, of the secondary interference fringes (number/mm²) and the average center-line roughness, $R_a$, (μm) satisfy the following relationships:

said particles comprise polyethylene terephthalate as a homopolymer or a copolymer or block polymer comprising at least 80 mole percent of ethylene terephthalate.

4. The polyester film according to claim 1, wherein said calcium compound is selected from the group of calcium salts of aliphatic carboxylic acids, calcium salts of aromatic carboxylic acids, and calcium alkylates.

5. The polyester film according to claim 4, wherein said calcium compound is calcium acetate.

* * * * *